US012340926B2

(12) United States Patent
Hsiao et al.

(10) Patent No.: US 12,340,926 B2
(45) Date of Patent: Jun. 24, 2025

(54) HIGH-POWER RESISTOR AND FABRICATION METHOD THEREOF

(71) Applicant: YAGEO CORPORATION, Kaohsiung (TW)

(72) Inventors: Shen-Li Hsiao, Kaohsiung (TW); Hwan-Wen Lee, Kaohsiung (TW); Fu-Sheng Huang, Kaohsiung (TW)

(73) Assignee: YAGEO CORPORATION, Kaohsiung (TW)

( * ) Notice: Subject to any disclaimer, the term of this patent is extended or adjusted under 35 U.S.C. 154(b) by 373 days.

(21) Appl. No.: 17/930,071

(22) Filed: Sep. 7, 2022

(65) Prior Publication Data

US 2024/0013957 A1 Jan. 11, 2024

(30) Foreign Application Priority Data

Jul. 6, 2022 (CN) ......................... 202210796868.1

(51) Int. Cl.
*H01C 17/075* (2006.01)
*H01C 1/148* (2006.01)
*H01C 7/18* (2006.01)

(52) U.S. Cl.
CPC ........... *H01C 17/075* (2013.01); *H01C 1/148* (2013.01); *H01C 7/18* (2013.01)

(58) Field of Classification Search
CPC ......... H01C 17/075; H01C 1/148; H01C 7/18
See application file for complete search history.

(56) References Cited

U.S. PATENT DOCUMENTS 4,696,851 A * 9/1987 Pryor .................. H01L 21/4857 257/E23.173
10,115,505 B2 * 10/2018 Murakami ............. H01C 1/012
(Continued)

FOREIGN PATENT DOCUMENTS

CN 1092620 C 10/2002
CN 1726565 A 1/2006
(Continued)

OTHER PUBLICATIONS

JP2004260030 translation (Year: 2004).*
CN113113199 translation (Year: 2021).*

*Primary Examiner* — Kyung S Lee
(74) *Attorney, Agent, or Firm* — CKC & Partners Co., LLC

(57) ABSTRACT

A high-power resistor and a fabrication method thereof are provided. The method includes: providing a resistance substrate including resistance alloy material and a copper metal layer; forming a cuprous oxide layer on the resistance substrate by using the copper metal layer; sticking the resistance substrate to a ceramic substrate, in which the cuprous oxide layer is located between the resistance substrate and the ceramic substrate; performing a sintering process on the resistance substrate and the ceramic substrate to form a composite substrate; forming a plurality of terminal electrodes on the composite substrate to form the high-power resistor. Therefore, the high-power resistor includes the composite substrate and the terminal electrodes. The composite substrate includes a bonding layer disposed between the ceramic substrate and the resistance substrate to bond the resistance alloy material on the ceramic substrate, in which the bonding layer includes sintered cuprous oxide.

9 Claims, 4 Drawing Sheets

(56) References Cited

U.S. PATENT DOCUMENTS

| | | | | |
|---|---|---|---|---|
| 10,381,162 | B2 * | 8/2019 | McConnell | B23K 20/22 |
| 2018/0240576 | A1 | 8/2018 | Murakami et al. | |

FOREIGN PATENT DOCUMENTS

| | | | | | |
|---|---|---|---|---|---|
| CN | 108666057 | A | | 10/2018 | |
| CN | 109767885 | B | | 9/2020 | |
| CN | 113113199 | | * | 7/2021 | H01C 1/084 |
| JP | 2004260030 | | * | 9/2004 | |
| TW | 201007780 | A | | 2/2010 | |

* cited by examiner

HIGH-POWER RESISTOR AND FABRICATION METHOD THEREOF

RELATED APPLICATIONS

This application claims priority to China Application Serial Number 202210796868.1, filed Jul. 6, 2022, which is herein incorporated by reference.

BACKGROUND

Field of Invention

The present invention relates to a high-power resistor and a fabrication method.

Description of Related Art

High-power resistors are typically used in electrical measuring instruments to provide a function for measuring current. In a conventional high-power resistor, an insulating ceramic substrate or a thermally highly conductive typically substrate of aluminum nitride (AlN) is typically used as a carrier substrate. Then, a pasting process is performed to stick resistance material to the carrier substrate, or a physical vapor deposition (PVD) process is performed to deposit the resistance material on the carrier substrate. Thereafter, a protection layer and terminal electrodes are formed on the resistance material/carrier substrate to form the high-power resistor.

Regarding the conventional operation of performing the pasting process to stick the resistance material to the carrier substrate, the conventional operation requires a glue layer used to stick the resistance material to the carrier substrate. Generally, the thicker the resistance material is, the thicker the glue layer required for sticking the resistance material is, and thus a problem of heat dissipation is raised due to the degraded heat dissipation function of the carrier substrate caused by the thick glue layer.

Regarding the conventional operation of performing the physical vapor deposition process to deposit the resistance material on the carrier substrate, when thicker resistance material is deposited on the carrier substrate for a resistor have a low resistance value, a problem of layer split (for example, the resistance material is split from the carrier substrate) is easily raised due to thermal expansion.

SUMMARY

Embodiments of the present invention provide a high-power resistor and a fabrication method thereof to avoid the problems of heat dissipation and layer split caused by the conventional fabrication method of the conventional high-power resistor.

In accordance with one embodiment of the present invention, the fabrication method of the high-power resistor includes: providing a resistance substrate, wherein the resistance substrate includes a copper metal layer; forming a cuprous oxide layer on the resistance substrate by using the copper metal layer; sticking the resistance substrate to a ceramic substrate, in which the cuprous oxide layer is located between the resistance substrate and the ceramic substrate; performing a first sintering process on the resistance substrate and the ceramic substrate to form a composite substrate; and forming a plurality of terminal electrodes on the composite substrate to form the high-power resistor.

In some embodiments, the step of providing the resistance substrate includes: providing alloy resistance material; and performing an electroplating process on the alloy resistance material to form the copper metal layer on the alloy resistance material.

In some embodiments, the step of providing the resistance substrate includes: providing alloy resistance material; and performing a cold pressing process to bond the copper metal layer on the alloy resistance material.

In some embodiments, the step of forming the cuprous oxide layer on the resistance substrate including: performing a pickling process on the copper metal layer to form the cuprous oxide layer.

In some embodiments, the step of forming the cuprous oxide layer on the resistance substrate including: performing an oxygen plasma treatment on the copper metal layer to form the cuprous oxide layer.

In some embodiments, the step of sticking the resistance substrate to the ceramic substrate is performed by using a glue layer.

In some embodiments, the material of the ceramic substrate is aluminum nitride (AlN), and the fabrication method of the high-power resistor further includes: performing a second sintering process on the ceramic substrate to form an aluminum oxide layer on a surface of the ceramic substrate before sticking the resistance substrate to the ceramic substrate.

In some embodiments, a temperature of the second sintering process is greater than 850° C. and smaller than 1100° C.

In some embodiments, a temperature of the first sintering process is greater than or equal to 1000° C., and smaller than or equal to 1200° C.

In some embodiments, the first sintering process is performed by using a vacuum furnace or a nitrogen furnace.

In accordance with one embodiment of the present invention, the high-power resistor includes a composite substrate and a plurality of terminal electrodes. The terminal electrodes are disposed on the composite substrate. The composite substrate includes a ceramic substrate, an alloy resistance material and a bonding layer. The alloy resistance material is disposed on the ceramic substrate. The bonding layer is disposed between the ceramic substrate and the alloy resistance material to bond the alloy resistance material on the ceramic substrate, wherein the bonding layer includes sintered cuprous oxide.

In some embodiments, material of the ceramic substrate is aluminum oxide ($Al_2O_3$) or aluminum nitride.

In some embodiments, the composite substrate includes two opposite terminals, the terminal electrodes include a first terminal electrode and a second terminal electrode, the first terminal electrode is disposed on one of the two terminals, and the second terminal electrode is disposed on another one of the two terminals.

In some embodiments, each of the terminal electrodes comprises an upper electrode, a lower electrode and a side electrode extended from the upper electrode to the lower electrode.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology but are not referred to particular order or sequence.

Figure 1:
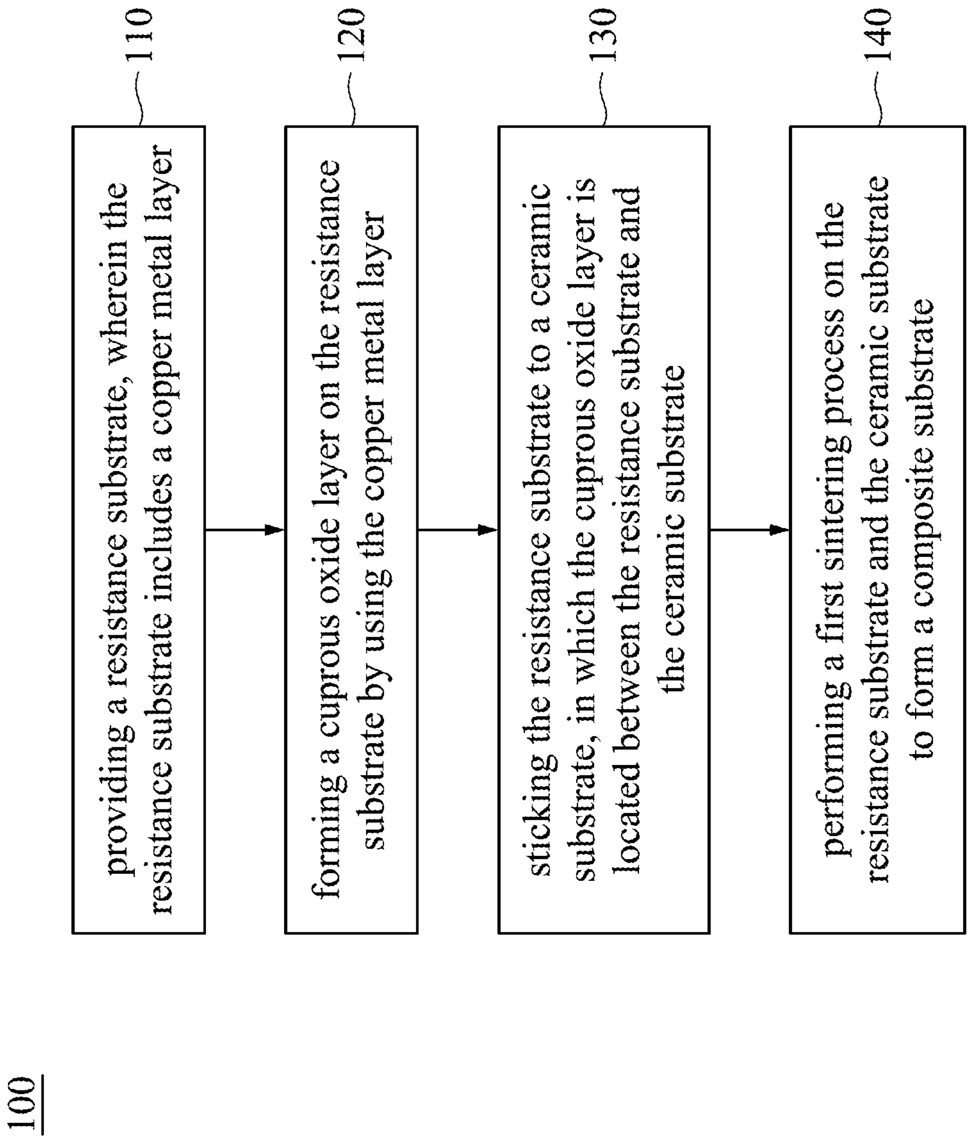
FIG. 1 is a schematic diagram showing a flow chart of a fabrication method of a substrate of a high-power resistor.
Figure 2:
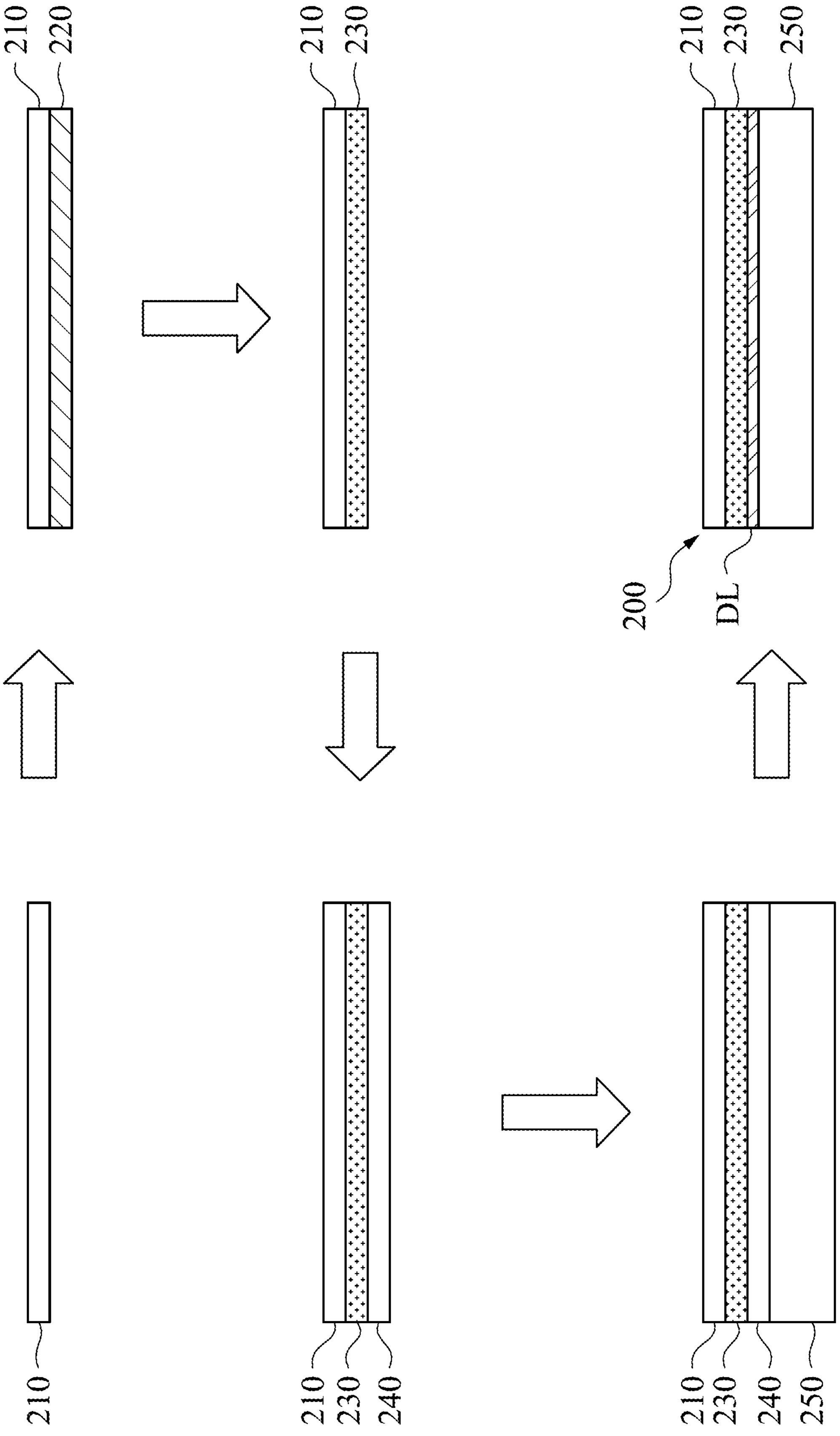
FIG. 2 is a schematic diagram showing structures of intermediate stages corresponding to the fabrication method of a substrate of a high-power resistor.

Referring to FIG. 1 and FIG. 2 simultaneously, FIG. 1 is a schematic diagram showing a flow chart of a fabrication method 100 of a substrate of a high-power resistor, and FIG. 2 is a schematic diagram showing structures of intermediate stages corresponding to the fabrication method 100 of a substrate of a high-power resistor. In the fabrication method 100 of a high-power resistor, at first, step 110 is performed to provide a resistance substrate. In this embodiment, the resistance substrate includes alloy resistance material 210 and a copper metal layer 220 disposed on the alloy resistance material 210. In this embodiment, the alloy resistance material 210 includes copper-silver alloy, nickel-chromium-copper alloy, nickel-chromium-silicon alloy, manganese-copper alloy, and nickel-copper alloy, but embodiments of the present invention are not limited thereto. The copper metal layer 220 is a metal layer of pure copper, for example, a copper metal layer having copper weight percentage greater than 99.50%. The copper metal layer 220 can be disposed on the alloy resistance material 210 in by using various different processes.

In some embodiments, an electroplating process is performed on the alloy resistance material 210 to form the copper metal layer 220 on a surface of the alloy resistance material 210. In some embodiments, a cold pressing process is performed on the alloy resistance material 210 to bond the copper metal layer 220 on a surface of the alloy resistance material 210. In some embodiments, a thickness of the copper metal layer 220 is smaller than 10 um.

Thereafter, step 120 is performed to form a cuprous oxide layer 230 on the alloy resistance material 210. In this embodiment, a pickling process is performed on the copper metal layer 220 to oxidize the copper metal layer 220 in step 120, thereby forming the cuprous oxide layer 230 on the alloy resistance material 210. However, embodiments of the present invention are not limited thereto. In some embodiments, an oxygen plasma treatment is performed on the copper metal layer 220 oxidize the copper metal layer 220 in step 120, thereby forming the cuprous oxide layer 230 on the alloy resistance material 210. In addition, all portions of the copper metal layer 220 are oxidized to form the cuprous oxide layer 230 in step 120.

Then, step 130 is performed to stick the alloy resistance material 210 to which the cuprous oxide layer 230 is attached to a ceramic substrate 250. In this embodiment, in step 130, a glue layer 240 is coated on the cuprous oxide layer 230, then the alloy resistance material 210 is stuck to the ceramic substrate 250 by using the glue layer 240 coated on the cuprous oxide layer 230, in which the cuprous oxide layer 230 is located between the ceramic substrate 250 and the alloy resistance material 210. In this embodiment, a pyrolysis temperature of the material of the glue layer 240 is smaller than 450° C., thereby enabling the glue layer 240 to be pyrolyzed and disappear in subsequent processes, but embodiments of the present invention are not limited thereto.

Thereafter, step 140 is performed to perform a first sintering process to co-sintering the ceramic substrate 250 and the alloy resistance material 210 to form a composite substrate 200. In this embodiment, in step 140, the ceramic substrate 250 and the alloy resistance material 210 stuck to the ceramic substrate 250 are disposed in a vacuum furnace for the first sintering process to obtain the composite substrate 200. However, embodiments of the present invention are not limited thereto. In some embodiments, in step 140, the ceramic substrate 250 and the alloy resistance material 210 stuck to the ceramic substrate 250 are disposed in a nitrogen furnace for the first sintering process to obtain the composite substrate 200. In this embodiment, the first sintering process is an aerobic high-temperature environment sintering process, in which oxygen content is smaller than or equal to 100 ppm, and a process temperature is greater than or equal to 1000° C. and smaller than or equal to 1200° C.

Based on the above descriptions, steps 110-140 are performed to form the cuprous oxide layer 230 on the alloy resistance material 210, stick the alloy resistance material 210 to the ceramic substrate 250, and co-sinter the ceramic substrate 250 and the alloy resistance material 210, thereby using eutectic diffusion bonding to attach the alloy resistance material 210 to the ceramic substrate 250 and then obtaining the composite substrate 200 need for fabrication of a high-power resistor. Specifically, the cuprous oxide layer 230 and aluminum oxide ($Al_2O_3$) of the ceramic substrate 250 share oxygen atoms with each other, thereby forming a boding layer to bond the ceramic substrate 250 and the alloy resistance material 210 together through the eutectic diffusion bonding. In detail, a diffusion bonding layer DL is formed at the interface between the cuprous oxide layer 230 and the aluminum oxide of the ceramic substrate 250 because of the eutectic diffusion bonding, and thus the ceramic substrate 250 and the alloy resistance material 210 can be attached together by using the cuprous oxide layer 230 and the diffusion bonding layer DL located there between. In addition, because the glue layer 240 is pyrolyzed to disappear in the first sintering process, there is no residue glue exists between the ceramic substrate 250 and the alloy resistance material 210.

In the above embodiments, material of the ceramic substrate 250 can be aluminum oxide ($Al_2O_3$) or aluminum nitride (AlN). Under the condition that the material of the ceramic substrate 250 is aluminum nitride, a second sintering process is performed on the ceramic substrate 250 before step 130, thereby forming an aluminum oxide layer on the surface of the ceramic substrate 250 to benefit the oxygen atoms sharing between the cuprous oxide and the aluminum oxide for the eutectic diffusion bonding. In this embodiment, the second sintering process is performed at atmospheric pressure and a process temperature is greater than 850° C. and smaller than 1100° C., but embodiments of the present invention are not limited thereto. Then, in step 130, the aluminum oxide layer of the ceramic substrate 250 is attached to the cuprous oxide layer 230 on the alloy resistance material 210, in which the aluminum oxide layer is located between the cuprous oxide layer 230 and the ceramic substrate 250.

Figure 3:
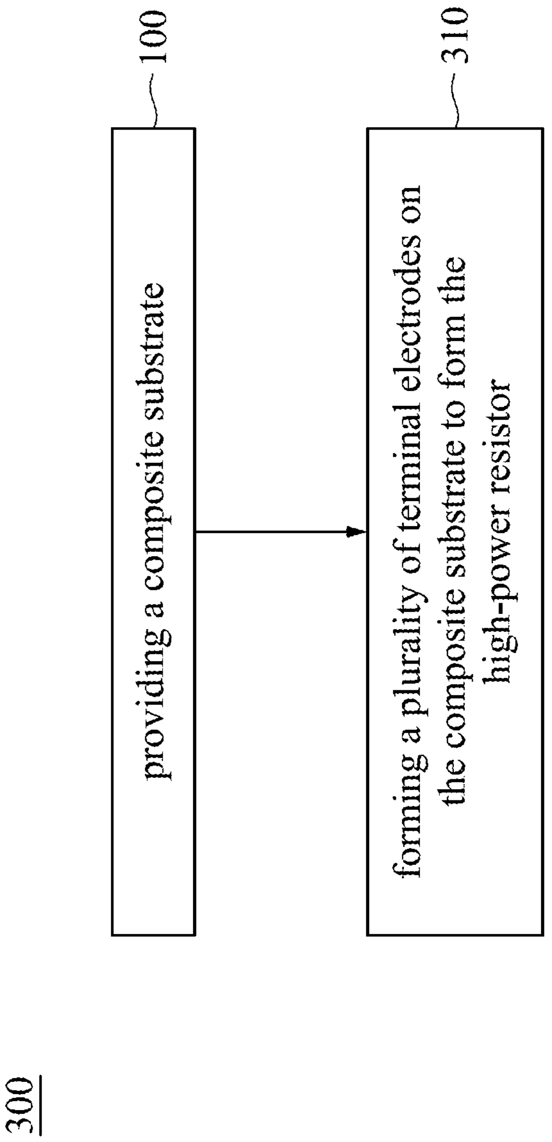
FIG. 3 is a schematic diagram showing a flow chart of a fabrication method of a high-power resistor.
Figure 4:
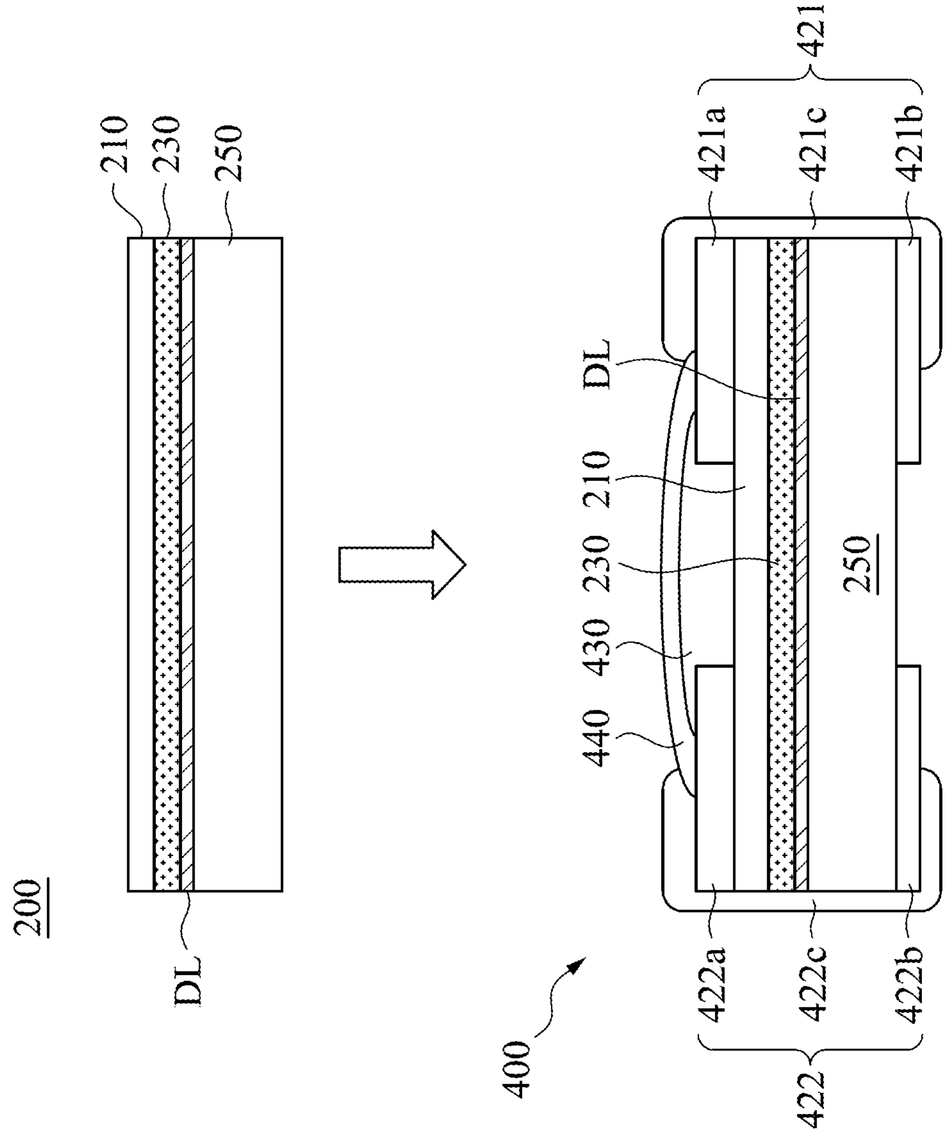
FIG. 4 is a schematic diagram showing structures of intermediate stages corresponding to the fabrication method of a high-power resistor.

Referring to FIG. 3 and FIG. 4 simultaneously, FIG. 3 is a schematic diagram showing a flow chart of a fabrication method 300 of a high-power resistor, and FIG. 4 is a schematic diagram showing structures of intermediate stages corresponding to the fabrication method 300 of a high-power resistor. In the fabrication method 300 of a high-power resistor, at first, the fabrication method 100 of a substrate of a high-power resistor is performed to provide the composite substrate 200. As mentioned above, the composite substrate 200 includes the ceramic substrate 250, the alloy resistance material 210, and the bonding layer used to bond the alloy resistance material 210 on the ceramic substrate 250, in which the bonding layer includes the above sintered cuprous oxide layer 230 and diffusion bonding layer DL. Then, a plurality of terminal electrodes are formed on the composite substrate 200 to form a high-power resistor 400.

As shown in FIG. 4, in this embodiment, step 310 is performed to from a first terminal electrode 421, a second terminal electrode 422, a first protection layer 430 and a second protection layer 440 on the composite substrate 200. In step 310, at first, a first upper electrode 421*a* and a second upper electrode 422*a* are formed on opposite terminals of the alloy resistance material 210, and a first lower electrode 421*b* and a second lower electrode 422*b* are formed on opposite terminals of the ceramic substrate 250. Then, a first side electrode 421*c*, a second side electrode 422*c*, a first protection layer 430 and a second protection layer 440 are formed on the alloy resistance material 210 and the ceramic substrate 250, in which the first terminal electrode 421 includes the first upper electrode 421*a*, the first lower electrode 421*b* and the first side electrode 421*c*, and the second terminal electrode 422 includes the second upper electrode 422*a*, the second lower electrode 422*b* and the second side electrode 422*c*.

Specifically, the first side electrode 421*c* is disposed and extends on the first upper electrode 421*a*, the first lower electrode 421*b* and side surfaces of the alloy resistance material 210 and the ceramic substrate 250. In detail, a terminal of the first side electrode 421*c* is disposed on the first upper electrode 421*a*, and the first side electrode 421*c* extends to the first lower electrode 421*b* along the side surfaces of the alloy resistance material 210 and the ceramic substrate 250, and thus anther terminal of the first side electrode 421*c* is disposed on the first lower electrode 421*b*.

Similarly, the second side electrode 422*c* is disposed and extends on the second upper electrode 422*a*, the second lower electrode 422*b* and side surfaces of the alloy resistance material 210 and the ceramic substrate 250. In detail, a terminal of the second side electrode 422*c* is disposed on the second upper electrode 422*a*, and the second side electrode 422*c* extends to the second lower electrode 422*b* along the side surfaces of the alloy resistance material 210 and the ceramic substrate 250, and thus anther terminal of the second side electrode 422*c* is disposed on the second lower electrode 422*b*.

In this embodiment, material of the first protection layer 430 and the second protection layer 440 can be ink, polyimide layer, or solder resister. However, embodiments of the present invention are not limited thereto.

Based on the above descriptions, the fabrication method 100 of a substrate of a high-power resistor provides a solid composite substrate 200. Because the composite substrate 200 is provided by using eutectic diffusion bonding to attach the alloy resistance material 210 to the ceramic substrate 250, the problem of layer split in the conventional operation caused by thermal expansion of the alloy resistance material can be avoided. Further, the attaching between the ceramic substrate 250 and the alloy resistance material 210 is not achieved by using a glue layer, and thus the problem of heat dissipation in the conventional operation caused by a thicker glue layer is avoided. Therefore, the high-power resistor 400 fabricated by the fabrication method 300 can avoid the above mentioned problems in the conventional operation, because the fabrication method 300 applies the solid composite substrate to fabricate the high-power resistor 400.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A fabrication method of a high-power resistor, comprising:
- providing a resistance substrate, wherein the resistance substrate includes a copper metal layer;
- forming a cuprous oxide layer on the resistance substrate by using the copper metal layer;
- sticking the resistance substrate to a ceramic substrate, in which the cuprous oxide layer is located between the resistance substrate and the ceramic substrate;
- performing a first sintering process on the resistance substrate and the ceramic substrate to form a composite substrate; and
- forming a plurality of terminal electrodes on the composite substrate to form the high-power resistor;
- wherein material of the ceramic substrate is aluminum nitride (AlN), and the fabrication method of the high-power resistor further comprises:
- performing a second sintering process on the ceramic substrate to form an aluminum oxide layer on a surface of the ceramic substrate before sticking the resistance substrate to the ceramic substrate.

2. The fabrication method of claim 1, wherein providing the resistance substrate comprising:
- providing alloy resistance material; and
- performing an electroplating process on the alloy resistance material to form the copper metal layer on the alloy resistance material.

3. The fabrication method of claim 1, wherein providing the resistance substrate comprising:
- providing alloy resistance material; and
- performing a cold pressing process to bond the copper metal layer on the alloy resistance material.

4. The fabrication method of claim 1, wherein forming the cuprous oxide layer on the resistance substrate comprising:
- performing a pickling process on the copper metal layer to form the cuprous oxide layer.

5. The fabrication method of claim 1, wherein forming the cuprous oxide layer on the resistance substrate comprising:

performing an oxygen plasma treatment on the copper metal layer to form the cuprous oxide layer.

6. The fabrication method of claim 1, wherein sticking the resistance substrate to the ceramic substrate is performed by using a glue layer.

7. The fabrication method of claim 1, wherein a temperature of the second sintering process is greater than 850° C. and smaller than 1100° C.

8. The fabrication method of claim 1, wherein a temperature of the first sintering process is greater than or equal to 1000° C., and smaller than or equal to 1200° C.

9. The fabrication method of claim 1, wherein the first sintering process is performed by using a vacuum furnace or a nitrogen furnace.

* * * * *